(12) United States Patent
Lang et al.

(10) Patent No.: US 7,938,170 B2
(45) Date of Patent: *May 10, 2011

(54) COLD OR HEAT ACCUMULATOR AND PROCESS FOR ITS MANUFACTURE

(75) Inventors: Robert Lang, Taufkirchen (DE); Kemal-Edip Yidirim, Riemerling (DE); Wolfgang Kraemer, Munich (DE)

(73) Assignee: Webasto AG, Stockdorf (DE)

( * ) Notice: Subject to any disclaimer, the term of this patent is extended or adjusted under 35 U.S.C. 154(b) by 1158 days.

This patent is subject to a terminal disclaimer.

(21) Appl. No.: 11/460,746

(22) Filed: Jul. 28, 2006

(65) Prior Publication Data

US 2007/0039712 A1 Feb. 22, 2007

Related U.S. Application Data

(60) Continuation-in-part of application No. 11/327,432, filed on Jan. 9, 2006, now Pat. No. 7,500,309, which is a division of application No. 10/601,554, filed on Jun. 24, 2003, now Pat. No. 7,000,681.

(30) Foreign Application Priority Data

Sep. 11, 2002 (DE) .................................. 102 42 069

(51) Int. Cl.
*F28D 17/00* (2006.01)
(52) U.S. Cl. ................. 165/10; 62/431; 62/434; 62/437
(58) Field of Classification Search .................... 165/10, 165/61, 134.1, 150; 62/430, 434, 43
See application file for complete search history.

(56) References Cited

U.S. PATENT DOCUMENTS

| 3,387,767 | A | * | 6/1968 | Hecht | 417/48 |
| 4,064,914 | A | * | 12/1977 | Grant | 138/142 |
| 4,248,291 | A | * | 2/1981 | Jarmul | 165/4 |
| 4,572,864 | A | * | 2/1986 | Benson et al. | 428/305.5 |
| 4,942,654 | A | * | 7/1990 | Wright et al. | 29/890.035 |
| 4,993,481 | A | * | 2/1991 | Kamimoto et al. | 165/10 |
| 5,088,548 | A | | 2/1992 | Lindner et al. | |
| 6,003,320 | A | * | 12/1999 | Okamura et al. | 62/6 |

(Continued)

FOREIGN PATENT DOCUMENTS

DE 199 48 943 C2 4/2001

(Continued)

*Primary Examiner* — Allen J Flanigan
(74) *Attorney, Agent, or Firm* — Roberts Mlotkowski Safran & Cole, P.C.; David S. Safran

(57) ABSTRACT

A cold and/or heat accumulator with a plurality of carrier elements which are charged with a cold or heat storage medium, and with at least one heat exchanger which is designed to have a heat transfer medium flow through it in order to cause heat exchange between the cold or heat storage medium and the heat transfer medium. The at least one heat exchanger has a serpentine hollow section, and carrier elements are provided between the legs of the loops of the serpentine hollow section. Two heat exchangers can be provided with the loops of the serpentine hollow section one heat exchanger being interspersed with those of the serpentine hollow section of the other heat exchanger. Preferably, the carrier elements are made of a porous metal foam, and the inlet and outlet for the heat transfer medium are located together at a bottom area at one side of the accumulator.

7 Claims, 14 Drawing Sheets

U.S. PATENT DOCUMENTS

| | | | |
|---|---|---|---|
| 6,142,222 A * | 11/2000 | Kang et al. | 165/148 |
| 6,247,522 B1 | 6/2001 | Kaplan et al. | |
| 6,467,535 B1 * | 10/2002 | Shembekar et al. | 165/140 |
| 6,604,573 B2 * | 8/2003 | Morishima et al. | 165/153 |
| 6,621,702 B2 * | 9/2003 | Elias et al. | 361/700 |
| 6,672,372 B1 * | 1/2004 | Li et al. | 165/104.12 |
| 6,736,194 B2 * | 5/2004 | Rockenfeller et al. | 165/104.12 |
| 6,772,823 B2 * | 8/2004 | Hirano | 165/10 |
| 6,892,798 B2 * | 5/2005 | Lee et al. | 165/104.12 |

FOREIGN PATENT DOCUMENTS

WO    WO 98/04644    2/1998

\* cited by examiner

COLD OR HEAT ACCUMULATOR AND PROCESS FOR ITS MANUFACTURE

CROSS-REFERENCE TO RELATED APPLICATION

This application is a continuation-in-part of co-pending U.S. patent application Ser. No. 11/327,432, which is a division of U.S. patent application Ser. No. 10/601,554, now U.S. Pat. No. 7,000,681.

BACKGROUND OF THE INVENTION

1. Field of the Invention

The invention relates to a cold and/or heat accumulator with a plurality of carrier elements which are charged with a cold or heat storage medium, and with a heat exchanger which is designed to have a heat transfer medium flow through it in order to cause heat exchange between the cold or heat storage medium and the heat transfer medium. Furthermore, the invention relates to a process for producing a cold and/or heat accumulator.

2. Description of Related Art

Cold and/or heat accumulators can be used, for example, in conjunction with climate control of motor vehicles, especially for auxiliary climate control. A cold and/or heat accumulator is known, for example, from published European Patent Application EP 0 914 399 B1. In this publication, it has already been suggested that heat exchange between the cold and/or heat storage medium and the heat transfer medium be effected either by heat exchanger plates or by pipes. In the embodiment which uses heat exchanger plates, it is provided that the carrier elements which are charged with the cold or heat storage medium are arranged in a plate-shape with boundary walls, flow of heat transfer medium being provided between the boundary walls. In the embodiment which uses pipes, it is provided that a carrier element which is charged with the cold or heat storage medium is penetrated by a tube bundle which discharges into common feeds and outlets.

SUMMARY OF THE INVENTION

The primary object of the present invention is to develop a cold and/or heat accumulator and a production process such that improved heat exchange properties between the cold or heat storage medium and the heat transfer medium result and an economical and compact structure is achieved.

This object is achieved by the cold and/or heat accumulator in accordance with the invention having a heat exchanger with at least one serpentine hollow section, at least between some of the loops of which there being at least one respective carrier element. The preferably aluminum serpentine hollow section, relative to its overall dimensions, has a very large surface via which heat exchange occurs between the cold or heat storage medium and the heat transfer medium. In addition to the large surface, the serpentine shape also yields a long flow section for the heat transfer medium; this likewise has an advantageous effect on the heat exchange properties.

In one especially preferred embodiment of the cold and/or heat accumulator in accordance with the invention, it is furthermore provided that the height of the carrier elements is matched to the interval of the serpentines such that there is a force-fitted combination of the serpentine hollow section and the carrier elements. The force-fitted combination is enabled by the spring-elastic properties of the serpentine hollow section. In this way outstanding heat transfer properties can be achieved with a simple structure.

Preferably, in the cold and/or heat accumulator in accordance with the invention, it is provided that there are several serpentine hollow sections located next to one another.

Although this is not absolutely essential, in this connection it is furthermore preferred that the individual serpentines of the serpentine hollow sections which are located next to one another run essentially parallel to one another. One such structure makes it possible in particular for a carrier element to be located between two serpentines of several serpentine hollow sections at a time.

Furthermore, in the cold and/or heat accumulator in accordance with the invention, it is preferably provided that one end segment of the serpentine hollow section is used as the inlet of the heat transfer medium and the other end segment of the serpentine hollow section is used as the outlet of the heat transfer medium.

In this connection, one advantageous development of the cold and/or heat accumulator in accordance with the invention calls for there to be several serpentine hollow sections, of which one end segment at a time is connected to the common inlet of the heat transfer medium, the other end segment at the time being connected to a common outlet of the heat transfer medium. This approach makes it possible for the heat transfer medium to flow in parallel through several serpentine hollow sections. The number of serpentine hollow sections used can be chosen depending on the desired flow rate of the heat transfer medium.

In preferred embodiments of the cold and/or heat accumulator in accordance with the invention, it is furthermore provided that it has a housing in which there are at least carrier elements which are charged with the cold and/or heat storage medium and the heat exchanger. The housing can be made cuboidal for example, preferably a cuboidal surface being made as the housing cover. The housing can be produced fundamentally from any suitable material, but preferably has good heat insulation properties in order to minimize heat exchange between the cold or heat storage medium and the vicinity of the housing.

In this connection, it can furthermore be advantageously provided that at least some intermediate spaces are foamed between the housing and the carrier elements charged with the cold and/or heat storage medium and the heat exchanger. Foams can be, for example, PU foams. Foaming not only improves the insulation properties, but furthermore leads to the desired vibration attenuation. Depending on the embodiment, the foams can furthermore define the location of the combination of the heat exchanger and the carrier elements within the housing.

In especially preferred embodiments of the cold and/or heat accumulator in accordance with the invention, it is furthermore provided that the carrier elements are formed by one or more plates, especially by graphite plates, and most especially, plates made of metal foam.

Furthermore, it is preferred that the cold or heat storage medium is a phase changing material, for example, water or paraffin. Of course, also other phase changing materials which are well known to one skilled in the art can be used.

Furthermore, in one preferred embodiment of the cold and/or heat accumulator in accordance with the invention, it is provided that, between the carrier elements and the heat exchanger, there is corrosion protection at least in sections. The corrosion protection prevents contact corrosion between the preferably aluminum heat exchanger and the carrier elements which are charged with the cold or heat storage medium and which can be especially a water-filled graphite matrix. The corrosion protection can be, for example, plastic jacketing of the carrier elements and/or a surface coating of the heat exchanger. But other embodiments are also conceivable in which corrosion protection can be abandoned, for example, embodiments in which the heat exchanger or the serpentine hollow sections are made of plastic.

In a further development of the invention, two heat exchangers are provided with the loops of the serpentine hollow section of one heat exchanger being interspersed with those of the serpentine hollow section of the other heat exchanger. The legs of the loops of the serpentine hollow section of the two heat exchangers can run parallel to each other, laterally interspersed at the same heights or they can run orthogonally to each other, being vertically interspersed with each other with the legs of the loops of the serpentine hollow section of one of the heat exchangers being between the legs of the loops of the serpentine hollow section of the other heat exchanger.

Preferably, the carrier elements are made of a porous metal foam, and the inlet and outlet for the heat transfer medium of the heat exchanger used for cold storage and discharge are located together at a bottom area at one side of the accumulator.

The process in accordance with the invention for producing a cold and/or heat accumulator, especially a cold and/or heat accumulator in accordance with the invention, comprises the following steps:

a) fabrication of carrier elements and charging of the carrier elements with a cold and/or heat storage medium, b) fabrication of a heat exchanger which comprises at least one serpentine hollow section, and c) joining of the carrier elements and the heat exchanger by the following steps:

c1) Application of a force for elastic enlargement of the distance between at least two serpentines, c2) Arrangement of at least one carrier element in the enlarged interval between two serpentines, and c3) Removal of the force.

This process can be carried out comparatively easily, and thus economically, and yields a cold and/or heat accumulator which has outstanding properties for heat exchange between the cold or heat storage medium and the heat transfer medium due to the serpentine configuration of the heat exchanger. Otherwise, the process in accordance with the invention yields the advantages explained using the cold and/or heat exchanger in accordance with the invention in the same or similar manner, for which reason reference is made to the corresponding statements to avoid repetitions.

The same applies in a general sense to the following preferred embodiments of the process in accordance with the invention, also with respect to the advantages which can be achieved by these developments reference being made to the respective corresponding explanations in conjunction with the cold and/or heat accumulator in accordance with the invention.

In especially preferred embodiments of the process in accordance with the invention, it is provided that, in the implementation of step a) and/or of step b), the height of the carrier elements is matched to the distance of the serpentines such that, after carrying out step c), there is a force-fitted combination of the serpentine hollow section and the carrier elements.

Furthermore, the process in accordance with the invention relates to embodiments in which it is provided that fabrication of the carrier elements according to step a) comprises cutting to size and optionally stacking of one or more carrier material plates, especially of one or more graphite plates.

In the process in accordance with the invention it is furthermore provided that a phase changing material, for example water or paraffin, is used as the cold or heat storage medium.

Furthermore, it is regarded as especially advantageous if the process in accordance with the invention has several serpentine hollow sections located next to one another.

In this connection, one preferred development of the process in accordance with the invention calls for the individual loops of the serpentine hollow sections which are located next to one another to be located essentially parallel to one another.

In general, in the process in accordance with the invention, it is preferred that one end segment of the serpentine hollow section is made as the inlet of the heat transfer medium and the other end segment of the serpentine hollow section is made as the outlet of the heat transfer medium. In doing so, it can be especially provided that there are several serpentine hollow sections, of which one end segment is connected to the common inlet of the heat transfer medium, and the other end segment is connected to the common outlet of the heat transfer medium.

In one preferred development of the process in accordance with the invention, it furthermore comprises the following additional step of:

d) providing a housing and inserting the carrier elements which are charged with the cold or heat storage medium and the heat exchanger which has been joined to them into the housing.

Here, it is considered advantageous if, in addition, there is the following step of:

e) foaming of at least some intermediate spaces between the housing and the carrier elements which have been charged with the cold or heat storage medium or the heat exchanger.

Furthermore, it is especially preferred that, before carrying out step c), there is corrosion protection is provided at least in sections between the carrier elements and the heat exchanger.

Preferred embodiments of the invention are explained below by way of example with reference to the accompanying drawings.

DETAIL DESCRIPTION OF THE INVENTION

Figure 1:
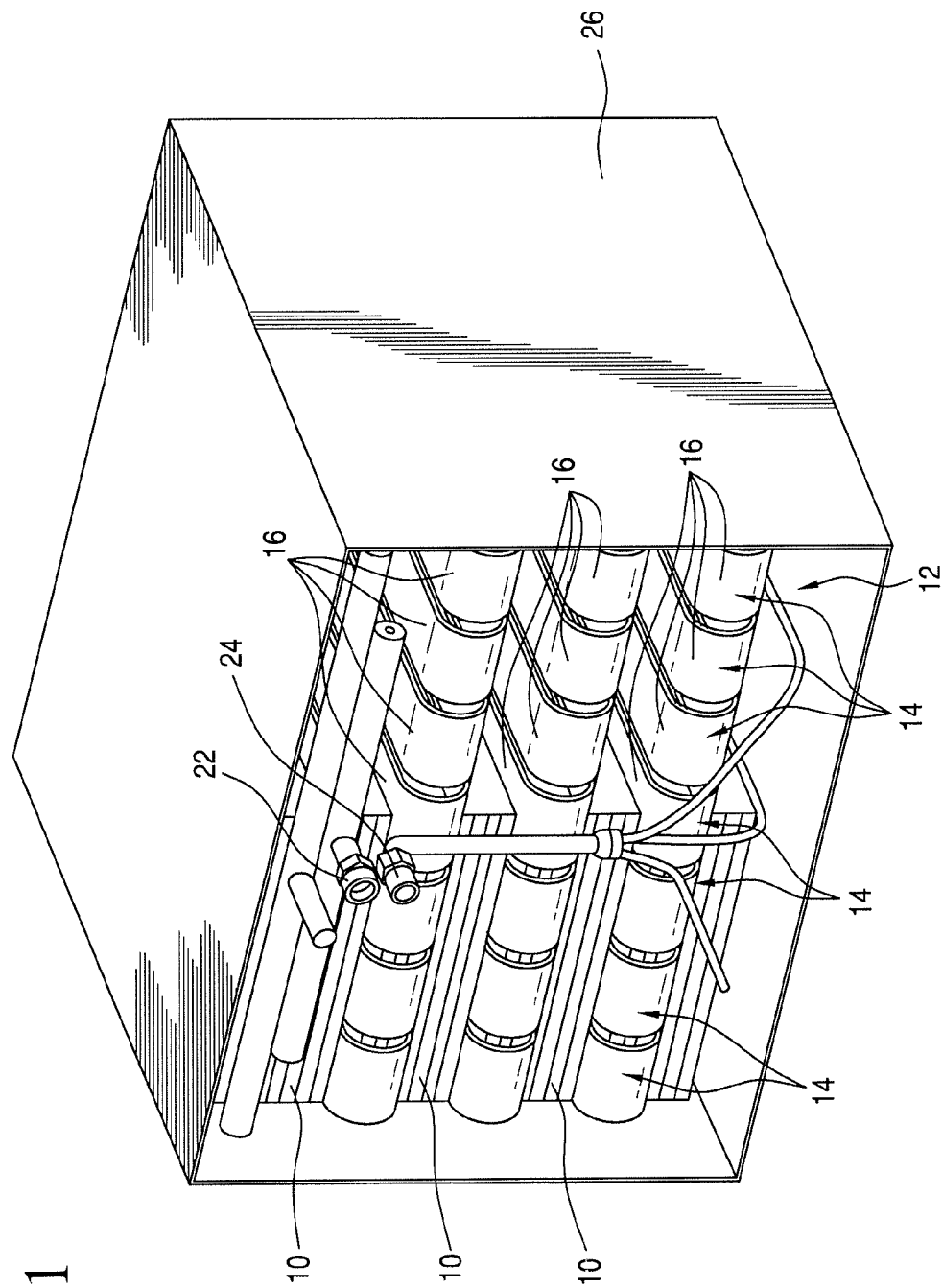
FIG. 1 is a schematic perspective view of one embodiment of the cold and/or heat accumulator in accordance with the invention which can be produced by the process in accordance with the invention.

FIG. 1 shows a schematic of one embodiment of the cold and/or heat accumulator in accordance with the invention which can be produced by the process in accordance with the invention. The cold and/or heat accumulator shown has a housing 26 in which there are the heat exchanger 12 and several carrier elements 10 in the form of graphite plates. The housing 26, in practice, is closed by a housing cover which is not shown. Furthermore, in the area of the heat exchanger 12 which is on the right in FIG. 1, for illustration of the structure of the heat exchanger 12, the carrier elements 10 have been omitted, although in practice there are also carrier elements 10 in the right-hand area of the heat exchanger 12. The heat exchanger 12, in this case, has seven serpentine hollow sections 14 which are located next to one another such that the individual loops 16 of the serpentine hollow sections 14 run parallel to one another. Each of the serpentine hollow sections 14 has an end segment which is used as the inlet of the heat transfer medium and an end segment which is used as the outlet of the heat transfer medium, one end segment each of of the serpentine hollow sections 14 being connected to the common inlet 22 for the heat transfer medium, while the other end segment of each of the serpentine hollow sections 14 is connected to a common outlet 24 for the heat transfer medium. Although this is not shown, intermediate spaces between the housing 26 and the heat exchanger 12 or the carrier elements 10 are preferably filled with foam, in practice.

Figure 2:
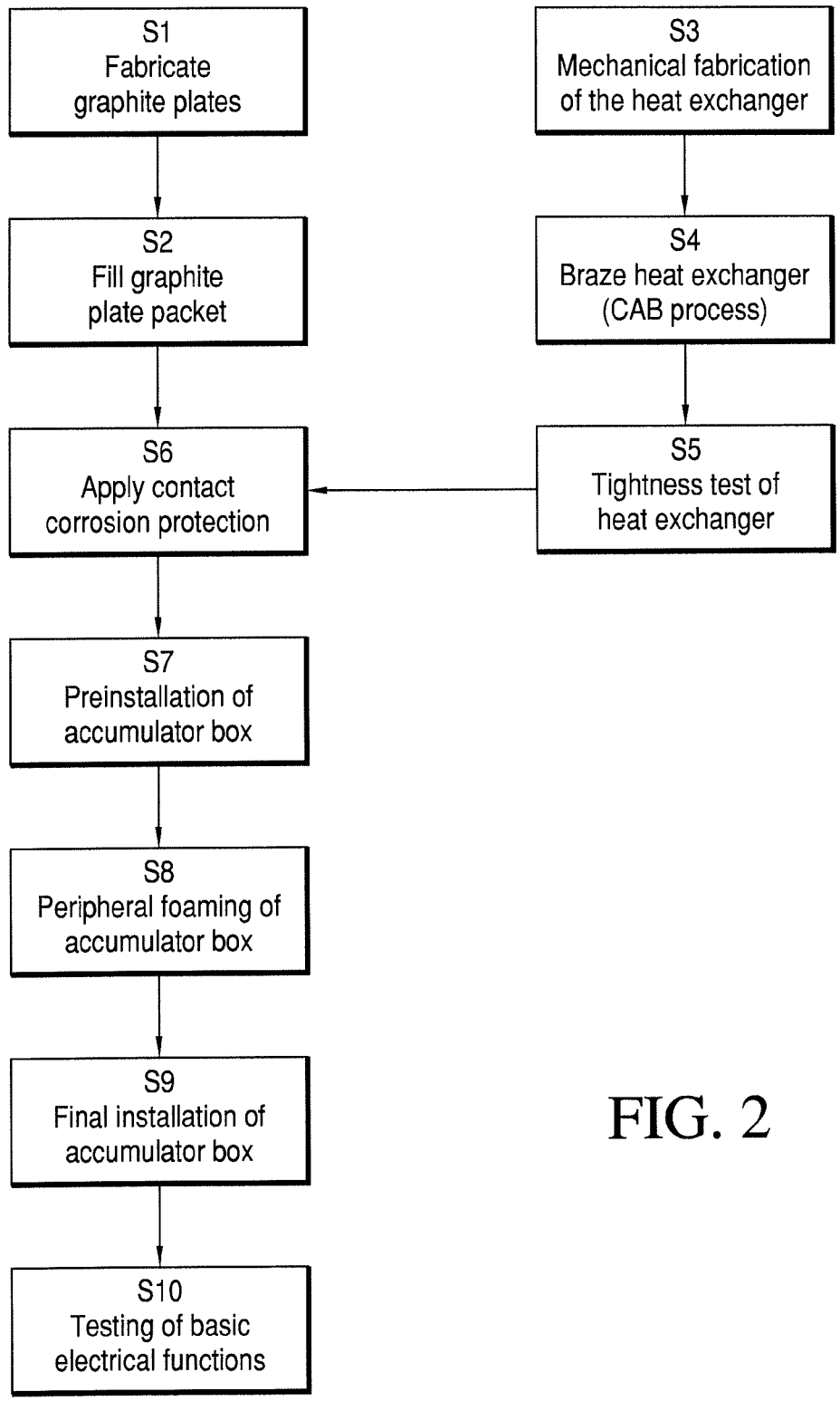
FIG. 2 is a flow chart which illustrates the steps of one embodiment of the process in accordance with the invention with which the cold and/or heat accumulator as shown in FIG. 1 can be produced.

FIG. 2 shows a flow chart which illustrates one possible embodiment of the process in accordance with the invention, with which the cold and/or heat accumulator as shown in FIG. 1 can be produced. In the embodiment shown, graphite plates are used as the carrier elements 10, for which reason graphite plate fabrication takes place in step S1. For this purpose, graphite plates are cut to size and layered into packets according to the size of the carrier element 10 which is to be produced.

In step S2, the graphite plates are charged with a cold or heat storage medium, for example, with water or paraffin, hereafter referred to a thermal storage medium. The graphite plate packets are filled in a vacuum in order to accelerate saturation of the graphite plate packets with the thermal storage medium. To safeguard the process, the graphite plate packets are weighed before filling. The thermal storage medium is preferably supplied via a metering unit depending on the size of the current graphite plate packets being filled. Alternatively, it is possible to work without a special metering unit if intentional overfilling is carried out, i.e., for example, saturation of the graphite plate packets with thermal storage medium of more than 85%. In this case, exact filling is ensured via a downstream drying process. In doing so, the filled graphite plate packet is dried, for example, with hot air as it is continuously weighed until the total weight corresponds to the desired degree of filling.

The steps S1 and S2, which are shown in FIG. 2, thus correspond to process step a) mentioned above.

The steps S3 to S6 shown in FIG. 2 illustrate one possibility for implementing process step b).

In step S3 mechanical production of the heat exchanger 12 from an aluminum hollow section takes place. For this purpose, the section is withdrawn from a coil and calendered. Afterwards, the calendared section passes through a bending machine to producing the required serpentine loops 16. At the end of the bending process, the section is cropped to size and the ends 18, 20 are worked for a subsequent brazing process by embossing.

In step S4, brazing of the heat exchanger 12 takes place, for example, by a CAB process. To do this, the heat exchanger 12 is prefabricated in a vise, i.e., the serpentine hollow section is joined to a brazing filler metal-coated and flux-coated distributor pipe and brazing filler metal-coated end caps for the distributor pipe and a brazing filler metal-coated fitting which is intended for the line connection, and they are braced to one another. Then, the brazing takes place in a furnace at roughly 600° C. in a predominant nitrogen atmosphere.

In step S5, a tightness test of the heat exchanger 12 is carried out. After brazing and cooling of the heat exchanger 12, this tightness test is carried out according to the DIN with helium, or alternatively with hydrogen, as the test gas. The heat exchanger 12 is placed in a chamber with helium or hydrogen detectors and flooded with the corresponding test gas. The amount of test gas emerging from the heat exchanger 12, and thus the tightness, can be ascertained via the detectors.

In step S6, the heat exchanger 12 is provided with corrosion protection. The corrosion protection is used to prevent contact corrosion between the aluminum heat exchanger 12 and the filled graphite matrix. Corrosion protection is provided in the form of a surface coating of the heat exchanger 12, a powder coating or enameling using the KTL process being possible. Alternatively, the filled graphite matrix can be jacketed, for example, with a plastic film. Both single-layer and also multi-layer jackets are possible for increasing the water vapor impermeability.

Figure 3:
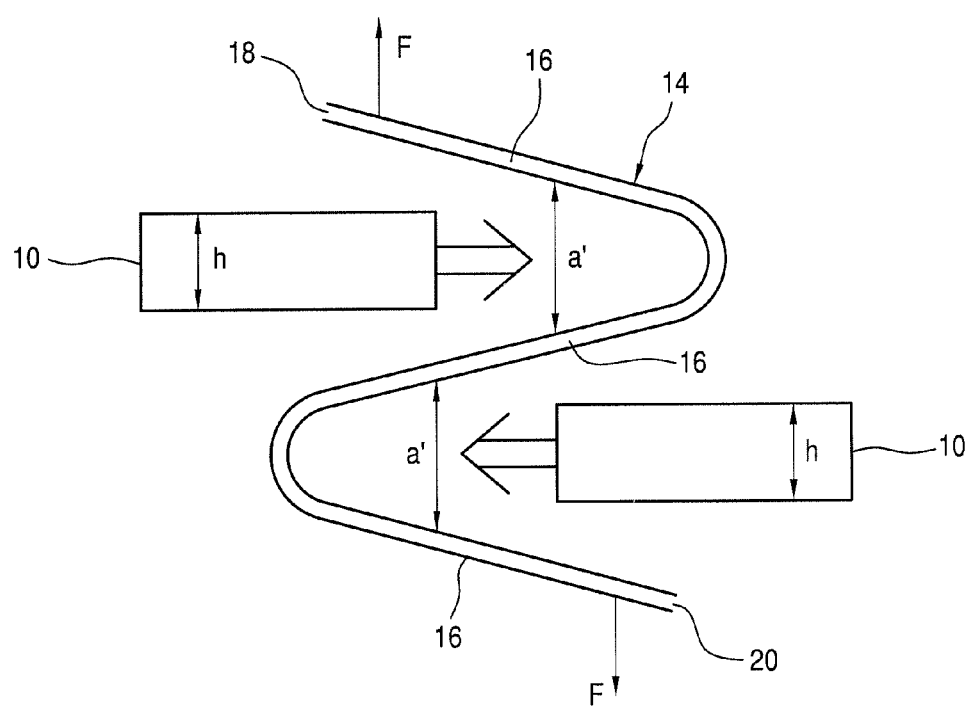
FIG. 3 shows a schematic which illustrates the implementation of steps c1) and c2) of the process in accordance with the invention.

Step S7, which is shown in FIG. 3, corresponds to the above described process step c) and can be designated pre-installation of the cold and/or heat accumulator. First, the carrier elements 10 or the filled graphite plate packets and the heat exchanger 12 are joined to one another. For this purpose, the serpentine loops 16 of the heat exchanger 12, in the elastic area, are widened with application of a force F, i.e., the distance a' between the individual serpentine loops 16 is increased in order to be able to place the individual carrier elements 10 between the serpentines 16 of the heat exchanger 12. Here, the carrier elements 10 or the graphite plate packets have an over-dimension, i.e., the height h of the packets is larger than the radius of the section bends. After placing the carrier elements 10 between the serpentine loops 16, the force F which is present is removed and the serpentine loops 16 spring back toward their original position. In this way, a force-fitted connection between the heat exchanger 12 and the individual carrier elements 10 is achieved. Then, according to the process step d), the carrier elements 10 charged with the cold or heat storage medium and the heat exchanger 12 joined to them are placed, oriented in position, into the housing 26 in order to be mounted there.

Step S8, which is shown in FIG. 2, corresponds to the process step e) and can be designated the foaming of the cold and/or heat accumulator. It is pointed out here that, as an alternative to the procedure described here, embodiments are also possible for the process in accordance with the invention, in which the combination of the carrier elements 10 and the heat exchanger 12 is peripherally foamed before insertion into the housing. In any case, the peripheral foaming is used to damp vibrations and to insulate the cold and/or heat accumulator, the peripheral foaming being carried out preferably such that the carrier elements 10 or the graphite plate packets and the heat exchanger 12 are jacketed uniformly with a polyurethane (PU) foam. This can be achieved especially by a two-part foaming process. Especially to avoid spaces in the housing or alternatively in the foaming tool, during a pre-foaming process of one cuboidal side of the housing, PU foam can be introduced in a defined manner. In this way, the combination of the carrier elements 10 and the heat exchanger 12 in the housing 26 or in the foaming tool is lifted to the final position. In a downstream finish-foaming process, the remainder of the housing 26 or foaming tool is foamed.

According to FIG. 2, in step S9, the finish-mounting of the cold and/or heat accumulator takes place, in this step additional attachment parts being mounted. Furthermore sensors are attached and a cable harness is installed.

In step S10, testing of the basic electrical functions is done as a conclusion, the cold and/or heat accumulator being checked for whether the electrical wiring is correct and the sensors work properly.

To carry out the process in accordance with the invention, especially diverse handling means and the following machines or systems can be used:

a filling machine which comprises the vacuum pump for filling the carrier elements 10 with the cold or heat storage medium, a special machine for aligning, bending, cropping and end-working of the heat exchanger 12, a brazing furnace with a nitrogen chamber, a test chamber for the tightness test with helium or hydrogen, and a PU foaming machine with a foaming tool which is specific to the workpiece.

FIG. 3 schematically illustrates the execution of steps c1) and c2) of the process in accordance with the invention. In doing so, the ends 18, 20 of the serpentine hollow section 14 are pulled apart by a force F such that the distance between the serpentine loops 16 is increased to an enlarged distance a'. Then, the carrier elements 10 are inserted between the individual serpentine loops 16, the carrier elements 10, with respect to their height h having a certain overdimension relative to the distance a which results between the serpentine loops 16 in the rest position when the force F is removed (FIG. 4).

Figure 4:
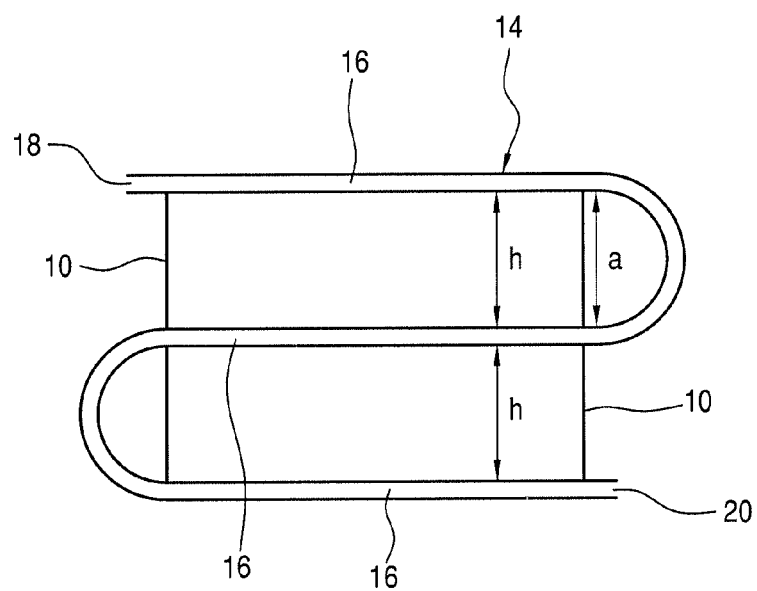
FIG. 4 is a schematic illustration of the arrangement of the carrier elements within a serpentine hollow section for the cold and/or heat accumulator as shown in FIG. 1, this arrangement arising after the implementation of step c3) of the process in accordance with the invention.

FIG. 4 schematically shows the arrangement of the carrier elements 10 within a serpentine hollow section 14 for the cold and/or heat accumulator as shown in FIG. 1, this arrangement arising after carrying out the step c3) of the process in accordance with the invention. After removing the force F, the serpentine hollow section 14 and the carrier elements 10 which are located between its serpentine loops 16 form a combination which yields outstanding heat transfer properties for heat exchange between the cold or heat storage medium which is provided in the carrier elements 10 and the heat transfer medium which is supplied to the end segment 18 of the serpentine hollow section 14 and is discharged on the end segment 20 of the serpentine hollow section 14.

Figure 5:
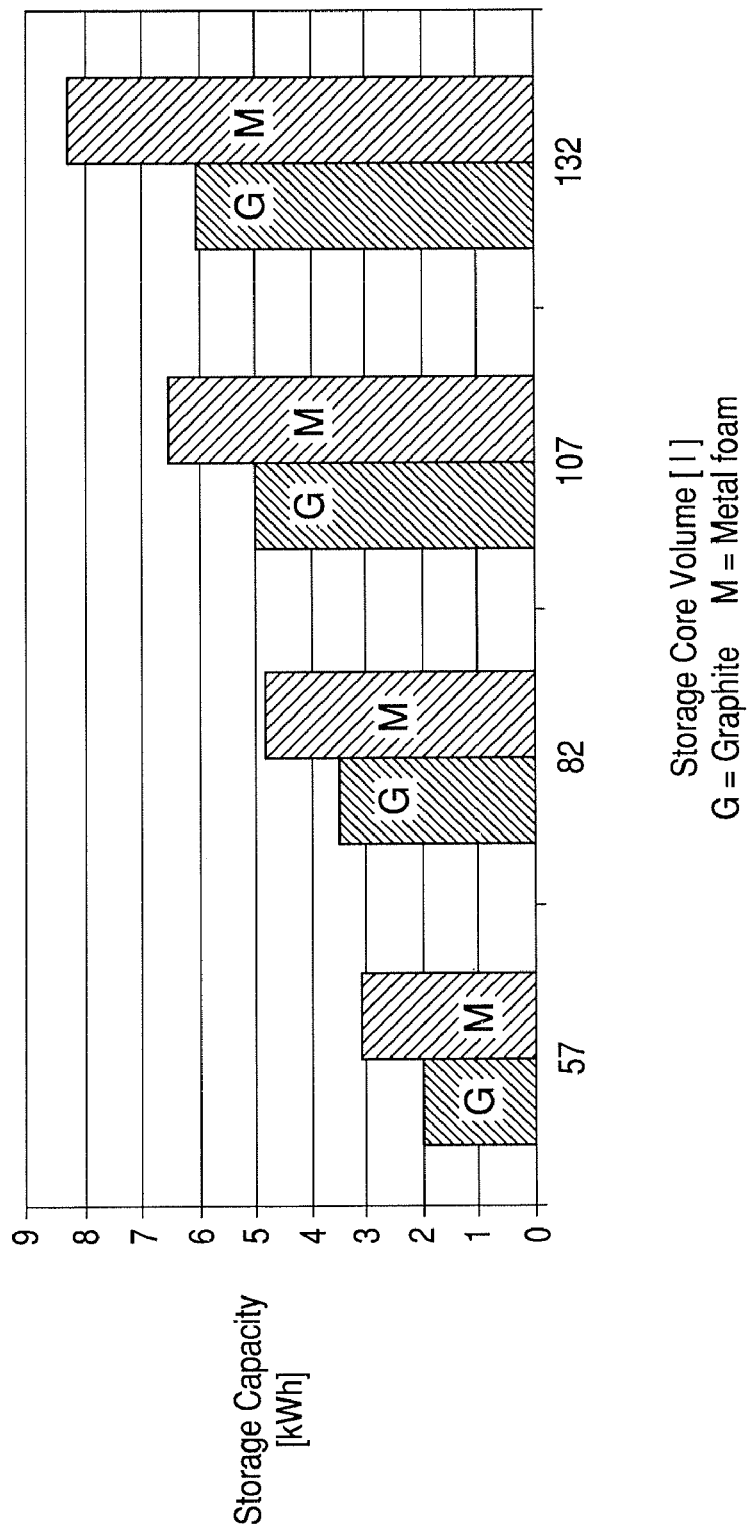
FIG. 5 is a graph comparing the storage capacity of graphite and a metal foam as a function of volume.
Figure 6:
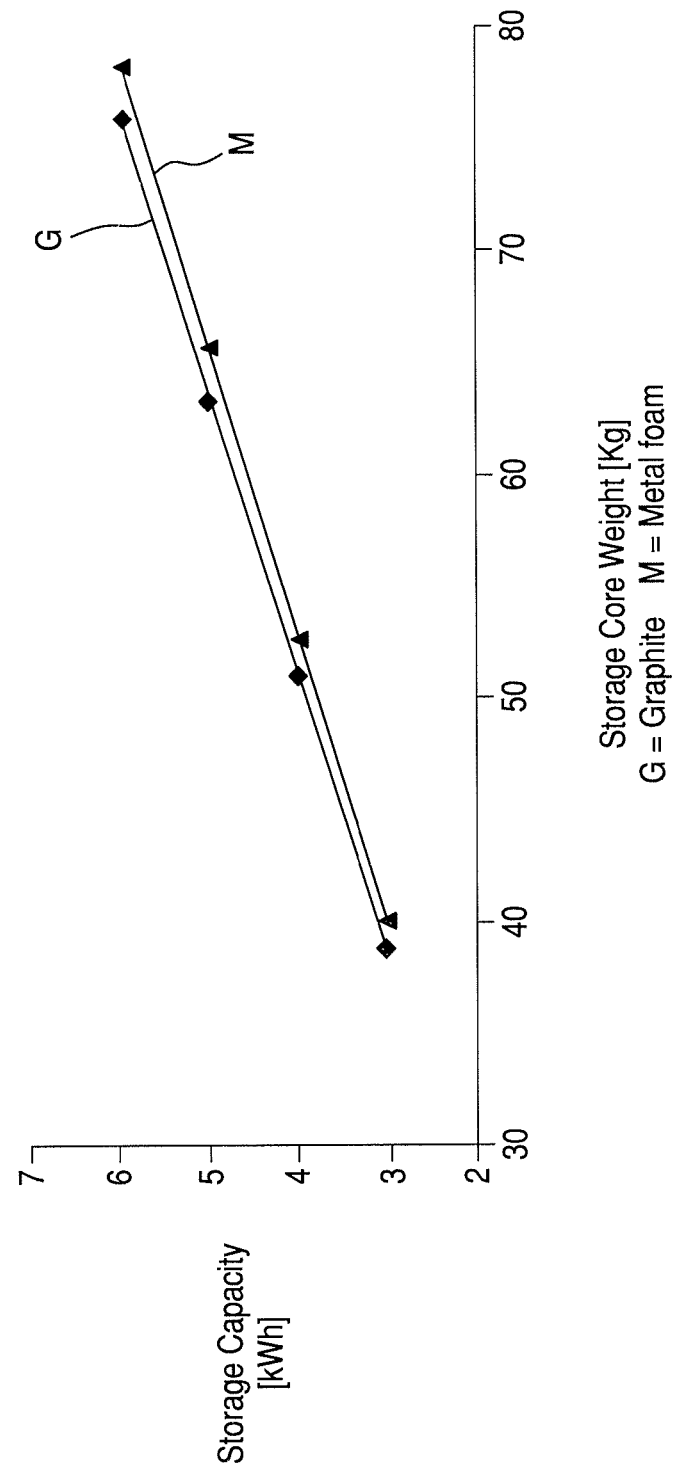
FIG. 6 is a graph comparing the storage capacity of graphite and a metal foam as a function of weight.
Figure 7:
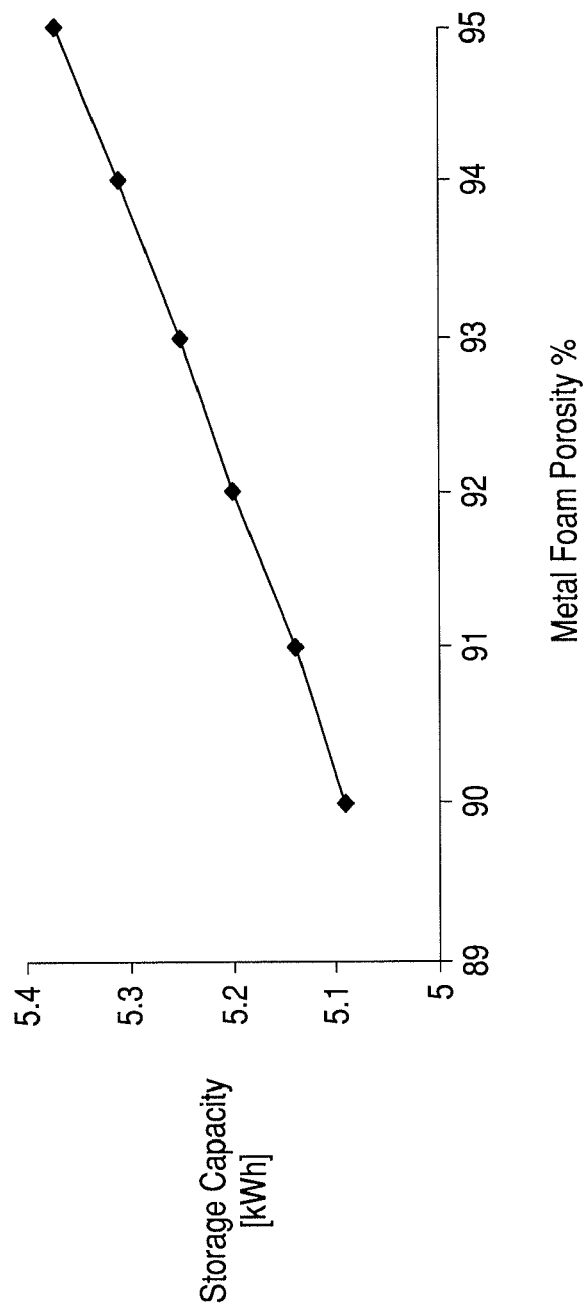
FIG. 7 is a graph depicting the relationship between the storage capacity of the metal foam and its porosity.

While the embodiments described above utilize carrier plates made of graphite, it has been discovered that the use of a metal foam is more advantageous, e.g., made of foamed aluminum. As can be seen from FIG. 5, for a given volume, a metal foam storage core has a storage capacity that is larger by one quarter to one third that of a core made of graphite. Additionally, a decrease in weight also results from the change from graphite to metal foam as is apparent from FIG. 6. Furthermore, FIG. 7 shows that storage capacity increases significantly with increased porosity, and a metal foam with a porosity in a percentage range of 90 to 95% has been found most advantageous. In this regard, the increased performance reflected in FIG. 5 is associated with the fact that the metal foam can be saturated to a greater extent than can graphite plates and from the fact that the metal foam can be utilized, as shown in the embodiments described below, in a manner that fills the entire volume of the heat/cold accumulator (storage unit), increasing the area of contact between the heat storage medium and the heat exchanger(s). The resulting increased efficiency allows a given capacity to be obtained with a lighter and smaller storage unit.

Figure 8:
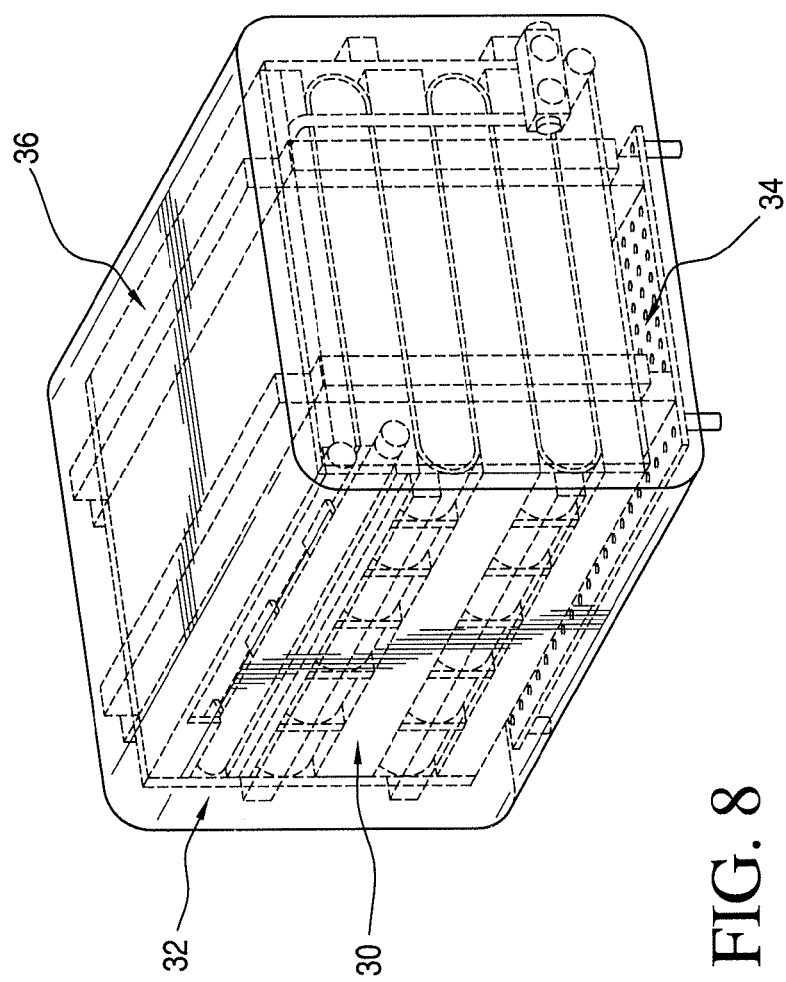
FIG. 8 is a schematic perspective view of latent cold and hot accumulator with two parallel interspersed heat exchangers.
Figure 9:
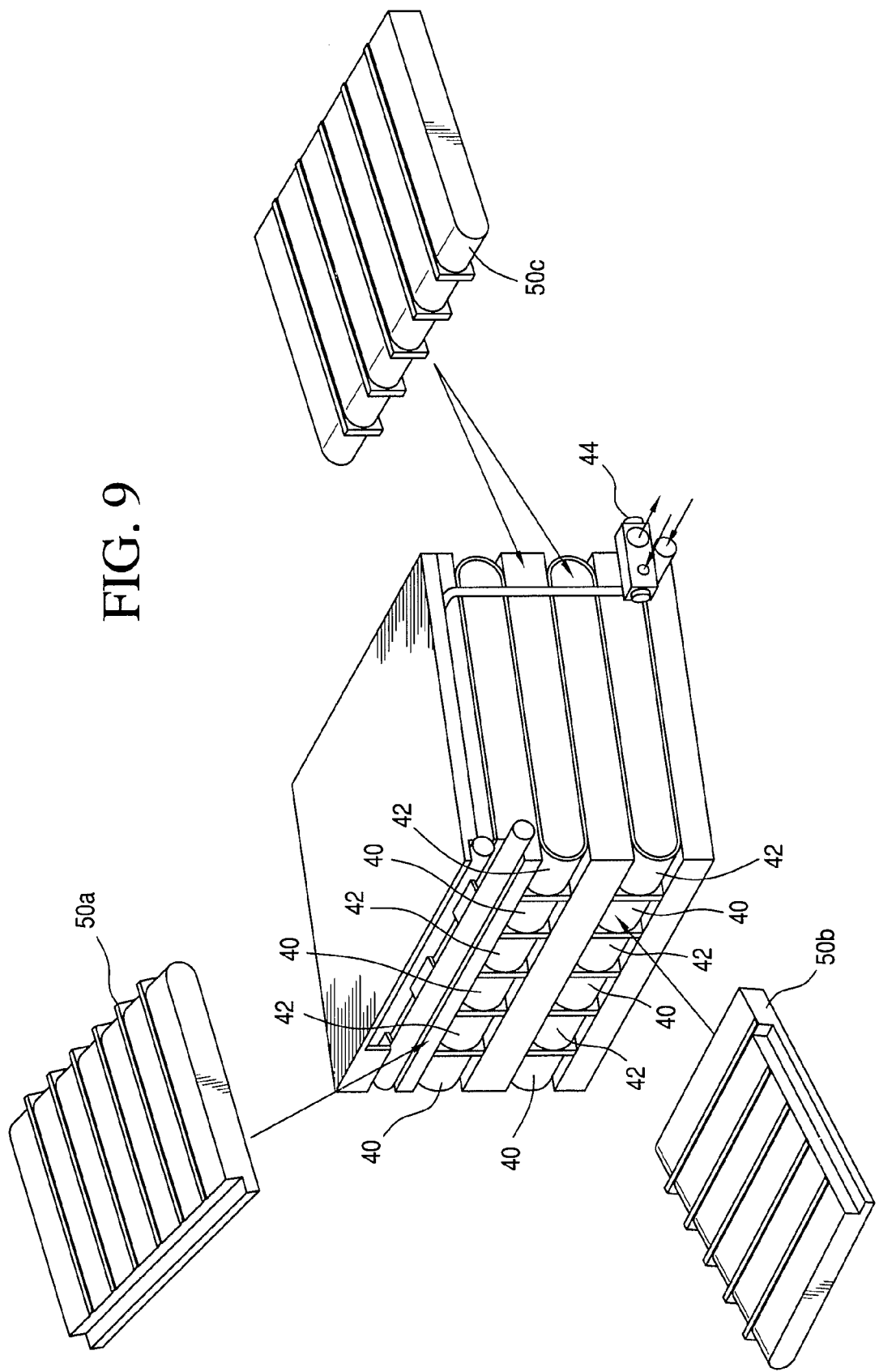
FIGS. 9 & 10 are views illustrating the configuration of the various carriers of the FIG. 8 accumulator.
Figure 10:
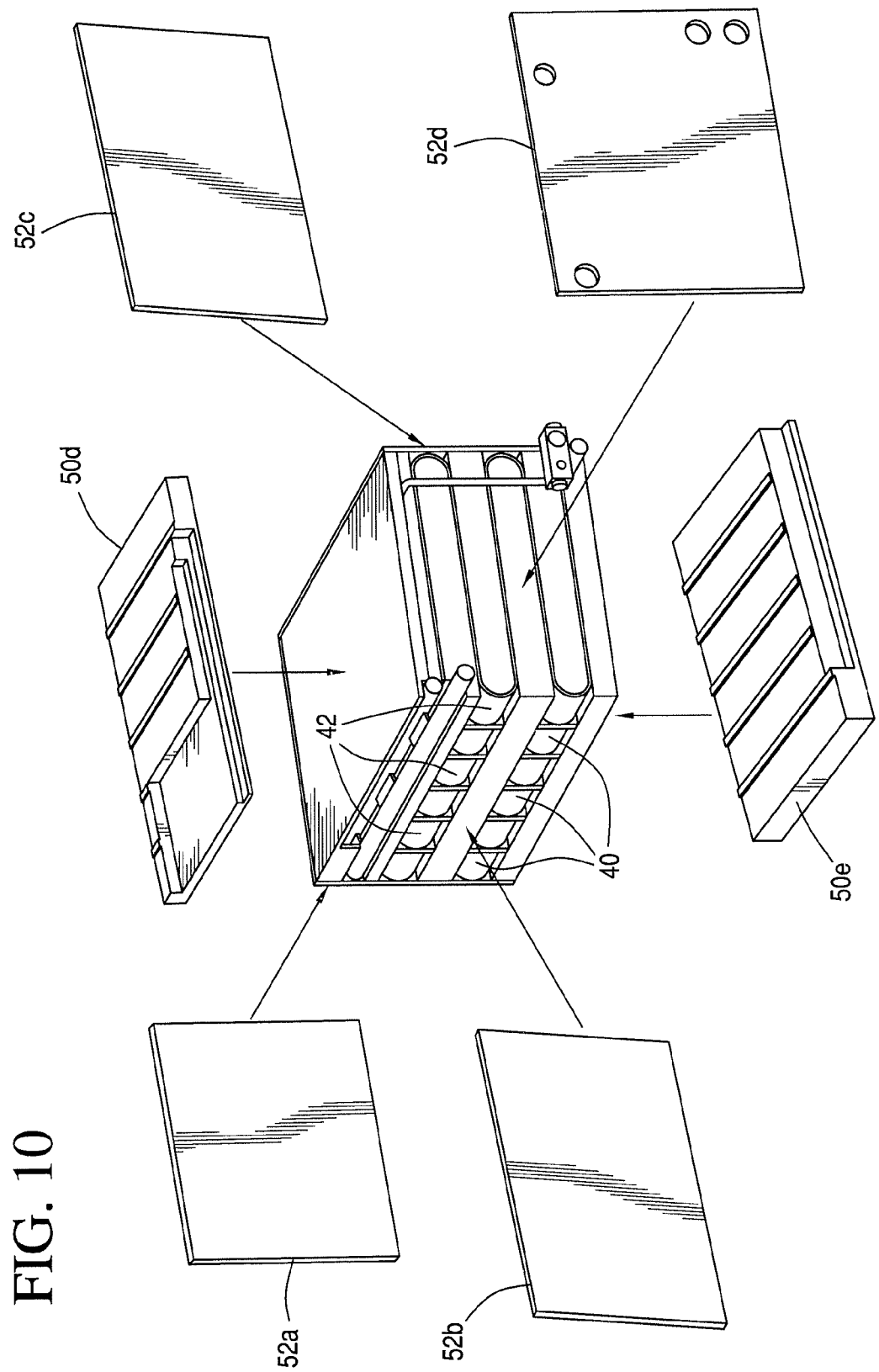

FIGS. 8-10 show a first embodiment of a heat and/or cold accumulator (storage unit) with carrier plates (storage core) made of a metal foam. FIG. 8 shows the storage unit as a whole in which the storage core 30 is supported within a plastic housing 32 on a perforated support plate 34, and spaced from the inner walls of the housing 32 and the support plate 34 by bars of polyurethane foam 36.

As can be seen from FIGS. 9 & 10, two heat exchangers are present. A first heat exchanger 40 being provided for charging/discharging cold into/from the storage unit and a second heat exchanger 42 being provided for charging/discharging heat into/from the storage unit. In the case of the heat exchanger 40 that is provided for charging/discharging cold, it has been found to be advantageous for the intake and discharge lines to be located together at a bottom area of one side of the accumulator where they are shown connected via a thermal expansion valve 44. On the other hand, advantageously, the heat exchanger 42 for charging/discharging heat has its intake at the bottom (shown below valve 44) and its outlet at the top.

As is also apparent from FIGS. 9 & 10, the carriers 50a-50e that form the storage core of the accumulator virtually fill the entire space in and around the heat exchangers 40, 42 that is enclosed by the housing panels 52a-52d. Additionally, the loops of the serpentine hollow section of the heat exchanger 40 and the loops of the serpentine hollow section of the heat exchanger 42 are laterally interspersed with each other at the same heights with the legs of the loops of the serpentine heat exchangers running parallel to each. In the case of the embodiment of FIGS. 9 & 10, the core elements 50a-50d fully cover the legs of the loops of the two serpentine heat exchangers all of the way to the end of the U-shaped bends between legs; however, as shown in FIG. 11, it is possible to simplify the construction of these core elements by having them leave the outer side of the U-shaped bends exposed and enclosing these U-shaped bend areas with recessed wall members of the type shown and described in connection with the embodiment of FIGS. 12-14.

Figure 11:
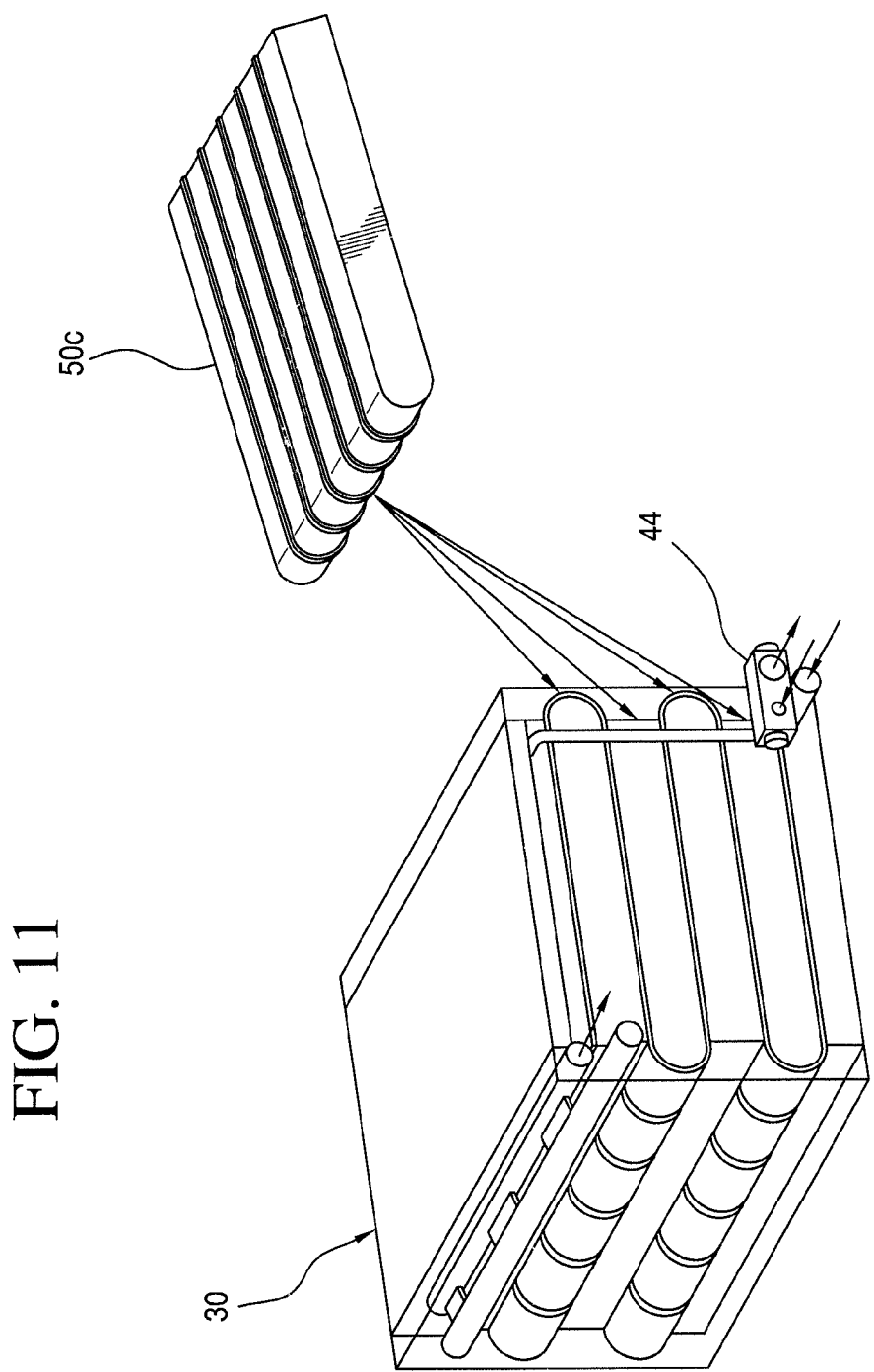
FIG. 11 illustrates a modification of the accumulator of FIGS. 7-10.
Figure 12:
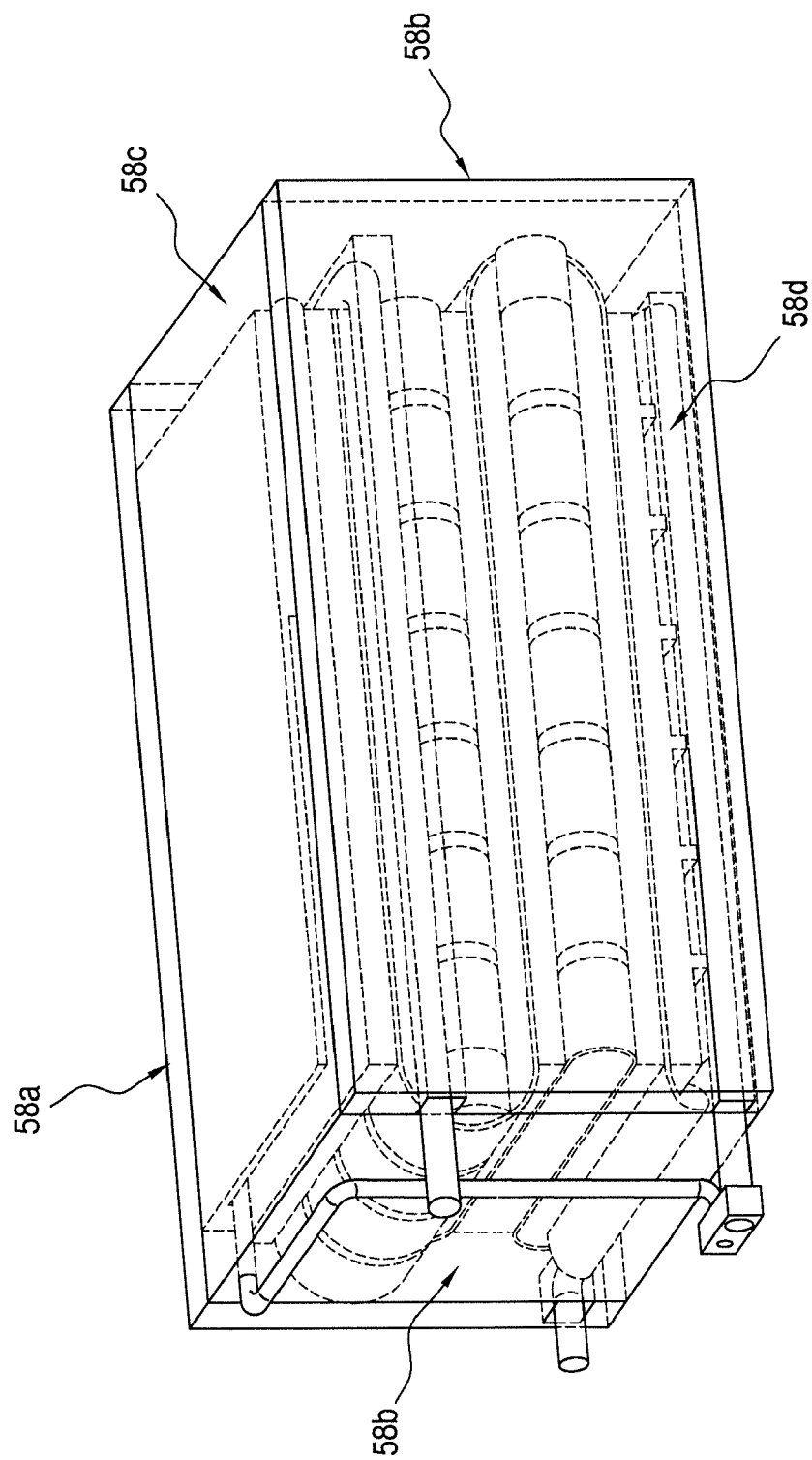
FIG. 12 is a schematic perspective view of latent cold and hot accumulator with two orthogonally interspersed heat exchangers.
Figure 13:
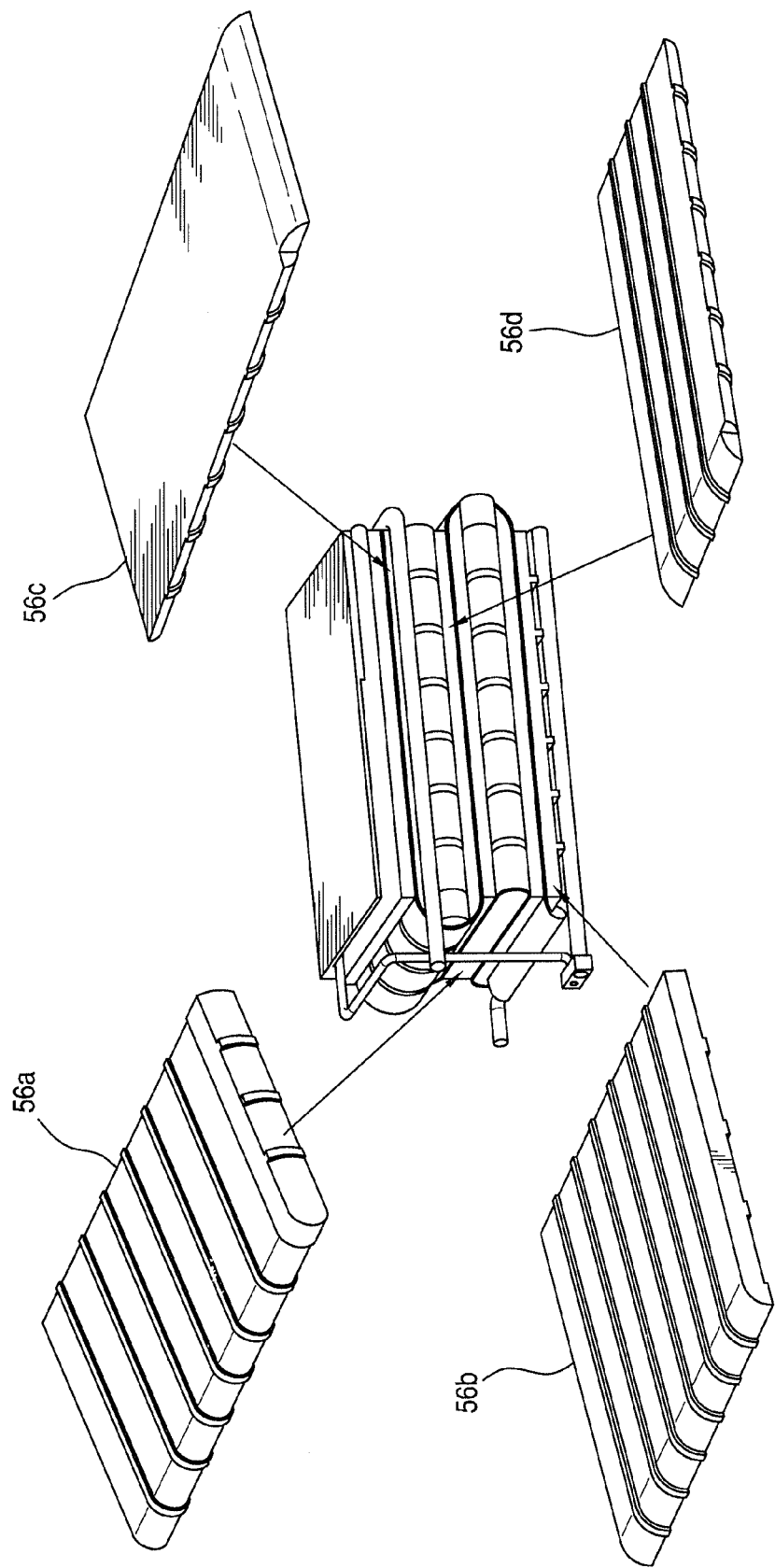
FIGS. 13 & 14 are views illustrating the configuration of the various carriers of the FIG. 8 accumulator.
Figure 14:
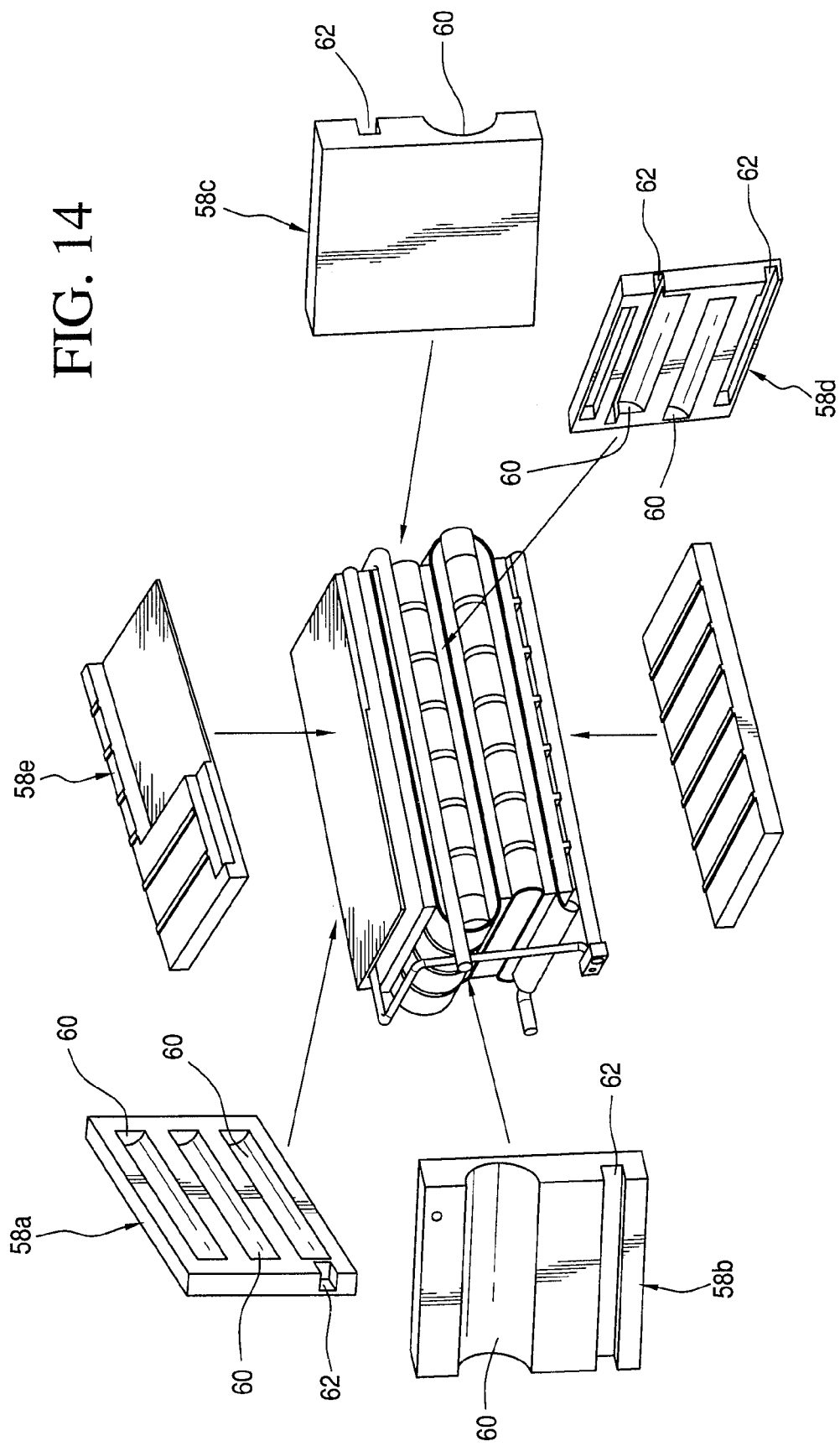

The embodiment of FIGS. 12-14 differs from that of FIG. 11 primarily in the relative orientation of the two heat exchangers. That is, in this embodiment, the legs of the loops of the serpentine hollow section of the first and second heat exchangers run orthogonally to each other and are vertically interspersed with each other, the legs of the loops of the serpentine hollow section of one of the heat exchangers being between the legs of the loops of the serpentine hollow section of the other heat exchanger. In this case, since the carriers 56a-56d between the legs of the serpentine hollow sections leave the outer surface of the U-shaped loop ends exposed at all four sides of the accumulator, each of these sides is covered by a respective end plate storage core element 58a-58e that has recesses 60 matched The features of the invention disclosed in the aforementioned description, in the drawings and in the claims can be important both individually and also in any combination for implementation of the invention.

What is claimed is:

1. Thermal accumulator, comprising: a plurality of carrier elements which are charged with a thermal storage medium, and at least one heat exchanger through which a heat transfer medium is flowable in heat exchange relationship to the thermal storage medium; wherein the at least one heat exchanger has a plurality of separate serpentine hollow sections arranged laterally next to one another; wherein each serpentine hollow section comprises at least two serpentine loops arranged sequentially one after the other, a respective one of the carrier elements being disposed in a respective loop of all of said plurality serpentine hollow sections.

2. Thermal accumulator in accordance with claim 1, wherein a common inlet and common outlet are provided for said plurality serpentine hollow sections and both said common inlet and said common outlet are located at a bottom area of one side of the accumulator.

3. Thermal accumulator, comprising: a plurality of carrier plates which are charged with a thermal storage medium, and at least one heat exchanger through which a heat transfer medium is flowable in heat exchange relationship to the thermal storage medium; wherein the at least one heat exchanger has at least two serpentine hollow sections extending parallel to each other in a side-by-side relationship, and at least two carrier plates, wherein a respective one of the carrier plates is disposed filling the distance between legs of a respective set of laterally adjoining loops of the at least two serpentine hollow sections.

4. Thermal accumulator in accordance with claim 3, further comprising a housing in which the carrier elements and the heat exchanger are disposed.

5. Thermal accumulator in accordance with claim 3, wherein the plates are made of a porous material and the thermal storage medium is a phase changing material with which the plates are saturated.

6. Thermal accumulator in accordance with claim 5, wherein the porous material is a metal foam.

7. Thermal accumulator in accordance with claim 6, wherein the metal foam has a porosity of between approximately 90% and 95%.

* * * * *